(12) United States Patent
Yamazaki et al.

(10) Patent No.: US 10,137,670 B2
(45) Date of Patent: Nov. 27, 2018

(54) ACOUSTIC MATERIAL AND MUSICAL INSTRUMENT

(71) Applicants: Yamaha Corporation, Hamamatsu-shi, Shizuoka (JP); Akita Prefectural University, Shimoshinjo-Nakano, Akita (JP)

(72) Inventors: Toshihisa Yamazaki, Hamamatsu (JP); Eri Hirai, Hamamatsu (JP); Hidefumi Yamauchi, Noshiro (JP)

(73) Assignees: Yamaha Corporation, Hamamatsu-shi (JP); Akita Prefectural University, Akita (JP)

( * ) Notice: Subject to any disclaimer, the term of this patent is extended or adjusted under 35 U.S.C. 154(b) by 0 days.

(21) Appl. No.: 15/399,783

(22) Filed: Jan. 6, 2017

(65) Prior Publication Data
US 2017/0197388 A1    Jul. 13, 2017

(30) Foreign Application Priority Data
Jan. 8, 2016    (JP) .................................. 2016-003033

(51) Int. Cl.
| | | |
|---|---|---|
| *B32B 21/13* | (2006.01) | |
| *B32B 7/12* | (2006.01) | |
| *B32B 21/14* | (2006.01) | |
| *G10C 3/06* | (2006.01) | |
| *G10D 1/00* | (2006.01) | |
| *B27K 3/15* | (2006.01) | |
| *B32B 7/00* | (2006.01) | |
| *B32B 37/10* | (2006.01) | |
| *B32B 37/18* | (2006.01) | |
| *B32B 21/04* | (2006.01) | |

(52) U.S. Cl.
CPC ................ *B32B 21/13* (2013.01); *B27K 3/15* (2013.01); *B32B 7/005* (2013.01); *B32B 7/12* (2013.01); *B32B 21/042* (2013.01); *B32B 21/14* (2013.01); *B32B 37/10* (2013.01); *B32B 37/18* (2013.01); *G10C 3/06* (2013.01); *G10D 1/005* (2013.01); *B32B 2260/026* (2013.01); *B32B 2260/046* (2013.01); *B32B 2307/10* (2013.01); *B32B 2317/16* (2013.01); *B32B 2451/00* (2013.01)

(58) Field of Classification Search
CPC ............ B32B 21/13; B32B 7/005; B32B 7/12; B32B 21/14; B32B 37/10; B32B 37/18; B32B 2260/026; B32B 2260/046; B32B 2307/10; B32B 2317/16; B32B 2451/00; B27K 3/15
USPC ....................................... 428/537.5
See application file for complete search history.

(56) References Cited

U.S. PATENT DOCUMENTS

2011/0274872 A1*  11/2011  Yu ............................. B27D 1/04
                                                            428/106

FOREIGN PATENT DOCUMENTS

| EP | 2 223 785 A2 |   | 9/2010 |
|----|--------------|---|--------|
| EP | 2223785 | * | 9/2010 |
| JP | 6-262601 | * | 9/1994 |
| JP | 6-262601 A |   | 9/1994 |

OTHER PUBLICATIONS

European Search Report issued in counterpart European Application No. 17150386.5 dated May 2, 2017 (six pages).
European Office Action issued in counterpart European Application No. 17150386.5 dated Feb. 14, 2018 (four (4) pages).
"Wood Density Chart", Workshop, Retrieved from https://cedarstripkayak.wordpress.com/lumber-selection/162-2/ (six (6) pages).

* cited by examiner

*Primary Examiner* — Leszek B Kiliman
(74) *Attorney, Agent, or Firm* — Crowell & Moring LLP

(57) ABSTRACT

An acoustic material is provided which includes a plurality of wood veneers laminated via an adhesive, in which the veneer is impregnated with the adhesive, and the adjacent veneers are substantially in contact with one another. The adjacent veneers are impregnated with the adhesive in an amount of preferably no less than 1 g/m$^2$ and no greater than 50 g/m$^2$ per unit area in and around a boundary region of the adjacent veneers. The adhesive may be a water-soluble adhesive or a water-based emulsion adhesive. The veneer may be a rotary veneer, a sawn veneer or a sliced veneer. A musical instrument is further provided which includes a sound board, in which the acoustic material is used as the sound board.

4 Claims, 7 Drawing Sheets

ACOUSTIC MATERIAL AND MUSICAL INSTRUMENT

BACKGROUND OF THE INVENTION

Field of the Invention

The present invention relates to an acoustic material and a musical instrument.

Discussion of the Background

As an acoustic material for configuring vibration materials and the like for musical instruments, for example, various woods are used. As the vibration material for musical instruments, in particular sound boards, use of a specific kind of natural wood board depending on a type of the musical instrument is supposed to be preferred in order to obtain a better tone quality. As an example, Brazilian rosewood is supposed to be appropriate for back plates of guitars, and Norway spruce is supposed to be particularly appropriate for sound boards of guitars, pianos and violins. However, such natural wood boards are relatively expensive since the production amount is limited, and there is also the inconvenience of significantly varying quality with respect to each board.

Therefore, it is proposed to utilize as an acoustic material, a laminated veneer lumber (LVL) in which veneers obtained by cutting a natural wood to have a thin-plate shape are laminated by means of an adhesive (for example, see Japanese Unexamined Patent Application, Publication No. H06-262601). The laminated veneer lumber is relatively low priced since the most part of a natural wood except for parts that include a knot and/or crack can be used as a raw material. In addition, the laminated veneer lumber is advantageous in terms of the quality being relatively stable since variation of a raw wood can be averaged through laminating a number of veneers.

In general, the wood which is excellent in acoustic characteristics as a sound board for a musical instrument is considered to have vibration characteristics such as relatively high speed of sound (sonic speed) and a small loss tangent (tan δ). However, although conventional laminated veneer lumber can be used for providing musical instruments and the like within relatively low price ranges at further lower prices, due to an increase in loss tangent caused by using an adhesive, it is difficult to produce a musical instrument with which intermediate and advanced players who are particular about sound quality are satisfied.

PRIOR ART DOCUMENTS

Patent Documents

Patent Document 1: Japanese Unexamined Patent Application, Publication No. H06-262601

SUMMARY OF THE INVENTION

Problems to be Solved by the Invention

In view of the inconvenience described above, it is an object of the present invention to provide an acoustic material and a musical instrument which are relatively low priced and excellent in vibration characteristics.

Means for Solving the Problems

According to an aspect of the invention made to solve the problems, an acoustic material includes a plurality of wood veneers laminated via an adhesive, wherein the veneer is impregnated with the adhesive, and adjacent veneers are substantially in contact with one another.

It is preferred that the adjacent veneers are impregnated with the adhesive in an amount of no less than 1 $g/m^2$ and no greater than 50 $g/m^2$ per unit area in and around a boundary region of the adjacent veneers.

The adhesive may be a water-soluble adhesive or a water-based emulsion adhesive.

The veneer is preferably a rotary veneer, a sawn veneer or a sliced veneer.

In addition, according to another aspect of the present invention made to solve the problems, a musical instrument comprises a sound board, wherein the acoustic material is used as the sound board.

Effects of the Invention

As described above, the acoustic material and the musical instrument of the aspects of the present invention are relatively lower priced and excellent in vibration characteristics.

DESCRIPTION OF EMBODIMENTS

Hereafter, embodiments of the present invention are described in detail with appropriate reference to the drawings.

Acoustic Material

An acoustic material of one embodiment of the present invention is configured from a plurality of wood veneers laminated via an adhesive. The acoustic material is provided as laminated veneer lumber (LVL) in which all the veneers are laminated so that the fiber directions are oriented in parallel.

In the acoustic material, the veneer is impregnated with the adhesive, and the adjacent veneers are substantially in contact with one another. In other words, in the acoustic material, the veneer is impregnated with the adhesive in its almost entire quantity, whereby the facing surfaces of the veneers are in close contact with one another, and thus the layer formed only from the adhesive does not exist between the facing surfaces of the veneers.

Figure 1:
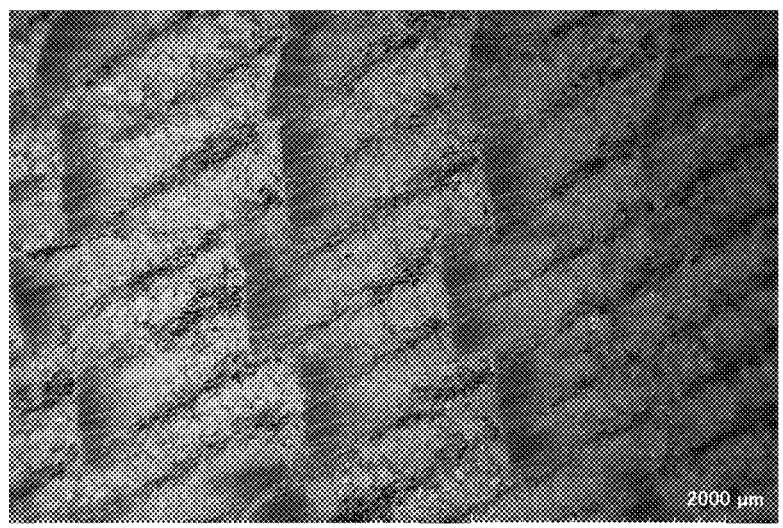
FIG. 1 shows a cross-sectional photograph of an acoustic material according to one embodiment of the present invention.
Figure 2:
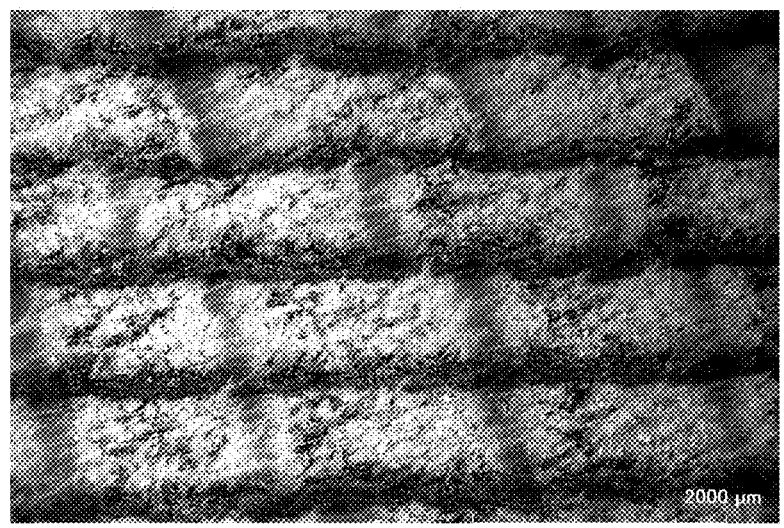
FIG. 2 shows a cross-sectional photograph of a conventional laminated veneer lumber.

More specifically, in the acoustic material, the veneer is impregnated with the adhesive to a degree that an adhesive layer cannot be ascertained in the case of observing a cross section as illustrated in FIG. 1. To the contrary, in a laminated veneer lumber having a conventional configuration as illustrated in FIG. 2, adhesive layers formed by a part of the adhesive not involved in the impregnation of the veneers are ascertained between the facing surfaces of the veneers. It should be noted that, the acoustic material shown in FIG. 1 is provided by laminating spruce veneers (thickness: 1 mm) by means of a water-soluble phenolic resin-based adhesive, with the amount of the adhesive per unit area being 10.4 $g/m^2$, and in the laminated veneer lumber shown in FIG. 2 is provided by laminating the spruce veneers (thickness: 1 mm) by means of the water-soluble phenolic resin-based adhesive, with the amount of the adhesive per unit area being 107.8 $g/m^2$.

Since the veneer is impregnated with the adhesive and the adjacent veneers are substantially in contact with one another in this manner, the adhesive which results in lowering of the sonic speed (i.e., speed of sound) and an increase of the loss tangent disperses, and thus the acoustic material has the vibration characteristics relatively similar to those of a solid wood material of a raw material timber of the veneer. In addition, since the veneer is used as a raw material in the acoustic material, the acoustic material can be fabricated through efficiently excluding undesirable parts such as knots and cracks in a raw wood material, thereby leading to a high yield and to averaging of a plurality of veneers in terms of variation and bias of the raw material timber; therefore the acoustic material has a stabilized quality. Accordingly, the acoustic material can be relatively low priced and excellent in vibration characteristics. In addition, it is possible to form the acoustic material to have a shape provided with a curved face without cutting, by embossing when the veneers are laminated. Therefore, in the case of using as a sound board of a violin and the like for example, the manufacturing cost of the musical instruments can be further reduced.

The lower limit of the sonic speed (propagation speed of vibration) at a frequency of 1 kHz in the direction along the fiber direction in the acoustic material is preferably 3,500 m/s, and more preferably 4,000 m/s. On the other hand, the upper limit of the sonic speed at a frequency of 1 kHz in the direction along the fiber direction in the acoustic material is preferably 6,500 m/s, and more preferably 6,000 m/s. In the case that the sonic speed at a frequency of 1 kHz in the direction along the fiber direction in the acoustic material is less than the lower limit, it may be impossible to efficiently generate the sound. To the contrary, in the case that the sonic speed at a frequency of 1 kHz in the direction along the fiber direction in the acoustic material exceeds the upper limit, the difference from a solid wood material of natural wood becomes great, and the tone quality may not be natural.

The lower limit of the sonic speed (propagation speed of vibration) at a frequency of 1 kHz in the vertical direction to the fiber direction in the acoustic material is preferably 800 m/s, and more preferably 900 m/s. On the other hand, the upper limit of the sonic speed at a frequency of 1 kHz in the vertical direction to the fiber direction in the acoustic material is preferably 1,300 m/s, and more preferably 1,200 m/s. In the case that the sonic speed at a frequency of 1 kHz in the vertical direction to the fiber direction in the acoustic material is less than the lower limit, it may be impossible to efficiently generate the sound. To the contrary, in the case that the sonic speed at a frequency of 1 kHz in the vertical direction to the fiber direction in the acoustic material exceeds the upper limit, the difference from a solid wood material of natural wood becomes great, and the tone quality may not be natural.

The lower limit of the loss tangent (tan δ) at a frequency of 1 kHz in the direction along the fiber direction in the acoustic material is preferably 0.002, and more preferably 0.005. On the other hand, the upper limit of the loss tangent at a frequency of 1 kHz in the direction along the fiber direction in the acoustic material is preferably 0.020, and more preferably 0.010. In the case that the loss tangent at a frequency of 1 kHz in the direction along the fiber direction in the acoustic material is less than the lower limit, the tone quality may not be natural. To the contrary, the loss tangent at a frequency of 1 kHz in the direction along the fiber direction in the acoustic material exceeds the upper limit, the efficiency of sound generation may be insufficient. It should be noted that the "loss tangent" is the ratio of loss shear modulus to storage shear modulus, and the value is also referred as "loss factor".

The lower limit of the loss tangent at a frequency of 1 kHz in the vertical direction to the fiber direction in the acoustic material is preferably 0.015, more preferably 0.020, and still more preferably 0.025. On the other hand, the upper limit of the loss tangent at a frequency of 1 kHz in the vertical direction to the fiber direction in the acoustic material is preferably 0.035, more preferably 0.032, and still more preferably 0.030. In the case that the loss tangent at a frequency of 1 kHz in the vertical direction to the fiber direction in the acoustic material is less than the lower limit, the tone quality may not be natural. To the contrary, in the case that the loss tangent at a frequency of 1 kHz in the vertical direction to the fiber direction in the acoustic material exceeds the upper limit, the efficiency of sound generation may be insufficient.

Veneer

Although the type of wood for the veneer used in the acoustic material may vary depending on its use, in the case of using as a sound board for a musical instrument, a needle-leaved tree such as e.g., a spruce and an Ezo spruce (*Picea jezoensis*) is preferred. However, depending on use, the type of wood for the veneer may be preferably a broadleaf tree such as e.g., a birch, a maple and a rosewood.

In addition, the lower limit of the relative density of dry wood (relative density at an equilibrium state after being left to stand in the atmosphere) for the veneer in the case of using as a sound board for a musical instrument is preferably 0.3 $g/cm^3$, and more preferably 0.35 $g/cm^3$. On the other hand, the upper limit of the relative density of dry wood for the veneer in the case of using as a sound board for a musical instrument is preferably 0.5 $g/cm^3$, and more preferably 0.45 $g/cm^3$. In the case that the relative density of dry wood for the veneer is less than the lower limit, the propagation speed of vibration in the acoustic material may be insufficient. To the contrary, in the case that the relative density of dry wood for veneer exceeds the upper limit, the loss tangent of the acoustic material may increase, and thus the efficiency of sound generation may be insufficient.

In the acoustic material, it is preferred that the veneer is a rotary veneer, a sawn veneer or a sliced veneer. Since it is possible to make the rotary veneer having a width exceeding the thickness of a raw wood material, a large one is available at a relatively low price. For this reason, by using the rotary veneer as the veneer, it is possible to make the size of the acoustic material larger relatively easily and at a low price. In addition, use of the rotary veneer as the veneer enables prevention of the distortion of the acoustic material due to a change with humidity and/or time. In the case of using the rotary veneer as the veneer, the acoustic material is similar to a flat grain board of a natural wood, and the quality thereof is relatively stabilized. On the other hand, by using a sawn veneer or sliced veneer as the veneer, it is possible to provide the acoustic material with the vibration characteristics similar to those of a straight-grained board of a natural wood suitably used as a sound board for musical instruments. It should be noted that: the "rotary veneer" is the veneer obtained by cutting away in the circumferential direction in such a way as to peel a log; the "sawn veneer" is the veneer obtained by cutting off a raw wood material with a saw; and the "sliced veneer" is the veneer obtained by slicing a raw wood material with a sharp cutter.

The lower limit of the average thickness of the veneer used for the acoustic material is preferably 0.3 mm, and more preferably 0.5 mm. On the other hand, the upper limit of the average thickness of the veneer used for the acoustic material is preferably 3 mm, and more preferably 2 mm. In the case that the average thickness of the veneer is less than the lower limit, a relative amount of the adhesive used increases, and thus the efficiency of sound generation may be insufficient due to an increase of the loss tangent. To the contrary, in the case that the average thickness of the veneer exceeds the upper limit, the yield of the veneer may decrease, whereby the acoustic material may be expensive, and the quality of the acoustic material may significantly vary due to a failure to normalize the variation in quality of the veneer.

It is preferred that the adjacent veneers are impregnated with the adhesive in an amount of no less than 1 g/m$^2$ and no greater than 50 g/m$^2$ per unit area in and around a boundary region of the adjacent veneers. Due to the adjacent veneers impregnated with the adhesive in such an amount per unit area in and around the boundary region of the adjacent veneers falling within the above range, lowering of the sonic speed and an increase of the loss tangent can be inhibited more certainly while securing the adhesion between the veneers. It should be noted that the "amount" of the adhesive means the mass of solid content (dry mass).

Adhesive

The adhesive used for the acoustic material is not particularly limited as long the veneer is impregnated therewith, and any of various adhesives used for wood adhesion such as e.g., epoxy-based, polyurethane-based, isocyanate-based, silicone-based and synthetic rubber-based adhesives may be used, and a water-soluble adhesive or a water-based emulsion adhesive is preferred. Due to the adhesive thus being the water-soluble adhesive or the water-based emulsion adhesive, an influence on the human body in a work environment through using an organic solvent for adjusting the viscosity of the adhesive can be excluded, leading to a benefit of allowing for a relatively long drying time period, whereby the veneer can be relatively easily impregnated with the adhesive, and therefore the manufacturing efficiency of the acoustic material can be enhanced.

The water-soluble adhesive is exemplified by a water-soluble phenolic resin-based adhesive, a water-soluble melamine resin-based adhesive, a urea resin-based adhesive, a resorcinol resin-based adhesive, and the like. In addition, the water-based emulsion adhesive is exemplified by a vinylacetate resin-based emulsion adhesive, an ethylene-vinylacetate copolymer resin-based emulsion adhesive, an acrylic resin-based emulsion adhesive, a water-soluble high polymer isocyanate-based adhesive, and the like.

The lower limit of the solid content concentration in the adhesive is preferably 5% by mass, more preferably 10% by mass, and still more preferably 15% by mass. On the other hand, the upper limit of solid content concentration in the adhesive is preferably 70% by mass, more preferably 40% by mass, and still more preferably 20% by mass. In the case that the solid content concentration in the adhesive is less than the lower limit, sufficient adhesion strength may not be achieved. To the contrary, in the case that the solid content concentration in the adhesive exceeds the upper limit, it may be difficult to reduce the applying quantity per unit area, and to impregnate the veneer with the adhesive, whereby the loss tangent of the acoustic material may increase and thus the efficiency of sound generation may be insufficient.

The viscosity of the adhesive when applying to the veneer may vary depending on an applying method, and for example, may be no less than 0.1 Pa·s and no greater than 10 Pa·s in terms of the measured value by means of a B-type viscometer at 25° C.

In addition, the adhesive used for the acoustic material, may include an additive such as e.g., a filler. The filler is used for adding an appropriate viscosity in applying the adhesive, and for preventing a decrease of the adhesion strength due to excessive impregnation of the veneer with the adhesive. As such a filler, for example, flour and the like may be used. In addition, the additive other than the filler is exemplified by a solvent, a curing agent (cross-linking agent), a catalyst, a diluent, a plasticizer, a tackifier and the like.

The lower limit of the amount of the adhesive with which the adjacent veneers are impregnated per unit area in and around a boundary region of the adjacent veneers, i.e., the amount of the adhesive existing per unit area in and around the region of the adjacent veneers between respective through-thickness centers thereof is preferably 1 g/m$^2$, more preferably 2 g/m$^2$, and still more preferably 4 g/m$^2$. On the other hand, the upper limit of the amount of the adhesive existing per unit area in and around the boundary region of the adjacent veneers is preferably 50 g/m$^2$, more preferably 30 g/m$^2$, still more preferably 25 g/m$^2$, and particularly preferably 20 g/m$^2$. In the case that the amount of the adhesive existing per unit area in and around the boundary region of the adjacent veneers is less than the lower limit, the adhesion between veneers may be insufficient. To the contrary, in the case that the amount of the adhesive existing per unit area in and around the boundary region of the adjacent veneers exceeds the upper limit, the loss tangent of the acoustic material may increase, and thus the efficiency of sound generation may be insufficient.

The upper limit of the area percentage of the adhesive remaining between the facing surfaces of the veneers without the impregnation of the veneers is preferably 3%, more preferably 1%, and still more preferably 0.5%. In the case that the area percentage of the adhesive remaining between the facing surfaces of the veneers without the impregnation of the veneers exceeds the upper limit, the loss tangent of the acoustic material may increase, and thus the efficiency of sound generation may be insufficient. It should be noted that the "area percentage of the adhesive remaining between the facing surfaces of the veneers without the impregnation of the veneers" is defined to be an average value of observed values on no less than 10 cross sections, each of the observed values being obtained by: observing the cross section in the thickness direction of the acoustic material by a microscope; and calculating a ratio of the total length, in the direction along the surface of the veneer, of the region where the adhesive not involved in the impregnation of the veneer exists to the length of the entire cross section in the direction along the surface of the veneer.

Production Method of Acoustic Material

The acoustic material can be produced by a method comprising the steps of: applying the adhesive on the surface of the veneer; laminating the veneers on which the adhesive is applied; and pressing a laminate of the veneers. In addition, it is preferred that the production method of the acoustic material comprises the step of aging to allow the moisture content of the acoustic material to reach equilibrium after the pressing step is performed.

Applying Step

In the applying step, the adhesive is applied on a surface of one side or surfaces of the both sides of the veneer. If applying the adhesive only on the surface of one side of the veneer, the applied amount of the adhesive is easily reduced. To the contrary, if applying the adhesive on the surfaces of the both sides of the veneers, the application unevenness of the adhesive can be reduced.

As the applying procedure of the adhesive to the veneer, for example, a spray system, ink-jet system or the like may be adopted. In particular, in the case that the ink-jet system is adopted, by using an ink-jet head positioned in the X-Y direction, it is possible to apply a small amount of the adhesive in a relatively uniform manner.

Laminating Step

In the laminating step, the veneers to which the adhesive is applied are laminated. In this step, the lamination is done so that the fiber direction of each veneer is in parallel.

Pressing Step

In the pressing step, a laminate of the veneers is pressed in the thickness direction, whereby the impregnation of the veneer with the adhesive is permitted so that the veneers are allowed to be substantially in contact with one another.

The lower limit of this pressing pressure is preferably 0.3 MPa, and more preferably 0.4 MPa. On the other hand, the upper limit of the pressing pressure is preferably 2.0 MPa, more preferably 1.5 MPa, and still more preferably 1.0 MPa. In the case that the pressing pressure is less than the lower limit, an adhesive layer of a part of the adhesive not involved in the impregnation of the veneer is formed between the facing surfaces of the veneers, and thus the vibration tangent may increase, whereby the efficiency of sound generation may be insufficient. To the contrary, in the case that the pressing pressure exceeds the upper limit, the veneer may be likely to be crushed.

In addition, the lower limit of the pressing temperature of the laminate is preferably 15° C., and more preferably 100° C. On the other hand, the upper limit of the pressing temperature of the laminate is preferably 250° C., and more preferably 200° C. In the case that the pressing temperature is less than the lower limit, the drying (adhesion) time period of the adhesive becomes so long that the manufacturing efficiency may be decreased. To the contrary, in the case that the pressing temperature exceeds the upper limit, deterioration of the veneer or the adhesive may in turn lead to deterioration of the quality of the acoustic material.

Although the pressing time period of the laminate may vary depending on a kind of adhesive and the pressing temperature, for example, the pressing may be carried out: at the pressing temperature of 140° C. for at least 3 minutes and at most 10 minutes; or at the pressing temperature of 20° C. (ordinary temperature) for at least 12 hours and at most 20 hours. In the case that the pressing time period is shorter than the lower limit, the adhesion between the veneers may be insufficient, and/or the adhesive not involved in the impregnation of the veneer may remain between the facing surfaces of the veneers, leading to an increase of the loss tangent. To the contrary, in the case that the pressing time period exceeds the upper limit, the manufacturing cost of the acoustic material may unnecessarily increase.

Aging Step

In the aging step, the acoustic material is left to stand for a certain period of time or longer so that the moisture content reaches equilibrium. This aging is performed at least in a roofed place, preferably in an air-conditioned room. The moisture content of the acoustic material after the aging, in other words, equilibrium moisture content (EMC) may be typically no less than 5% by mass and no greater than 15% by mass, which may depend on the temperature and humidity in the aging place.

While the aging time period is properly set depending on the thickness, etc., of the acoustic material, in the case that 10 veneers with a thickness of 1 mm are laminated, for example, the lower limit of the aging time period is preferably 3 days, and more preferably 5 days. On the other hand, the upper limit of the aging time period is preferably 10 weeks, and more preferably 3 weeks. In the case that the aging time period is shorter than the lower limit, distortion may occur after manufacturing the acoustic material. To the contrary, in the case that the aging time period exceeds the upper limit, the cost of the acoustic material may unnecessarily increase.

Musical Instrument

Moreover, the musical instrument according to another embodiment of the present invention is a musical instrument comprising a sound board, wherein the above-described acoustic material is used as the sound board.

Examples of the musical instrument include string instruments such as a cello, violin and guitar, and keyboard instruments such as a piano.

The musical instrument uses as a sound board, the aforementioned acoustic material which is relatively low priced but has relatively appropriate vibration characteristics accompanied by relatively small variation in quality; therefore, irrespective of being relatively low priced, the musical instrument is capable of producing the sound similar to the musical instrument manufactured by using a solid board of high-class natural. Accordingly, although the musical instrument is relatively low priced, yet it is possible to have the quality which satisfies intermediate and advanced players.

Other Embodiments

The embodiments described above do not restrict the constituent features of the present invention. Therefore, any omission, substitution and addition of each of the constituent features of the embodiments can be made on the basis of the description of the present specification and common general technical knowledge, and such omitted, substituted and/or added features are to be construed to entirely fall under the scope of the present invention.

EXAMPLES

Hereinafter, the present invention is described in detail by way of Examples, but the present invention should not be restrictively construed as being limited on the basis of the description of the Examples.

Production Examples 1 and 2

Ten rotary veneers made of a birch having a square plate shape with a width of 330 mm, a length of 500 mm and a thickness of 1 mm were laminated by means of an adhesive to produce a plurality of production examples 1 of an acoustic material (laminated veneer lumber). In the production example 1, the adhesive was applied by means of ink-jet so that the amount of the adhesive (in terms of solid content) per unit area in and around the boundary region of the adjacent veneers became 20 g/m². The adhesive used was prepared by adding 15 parts by mass of a cross-linking agent "AJ-1" manufactured by Koyo Sangyo Company to 100 parts by mass of a water-soluble high polymer isocyanate-based adhesive "KR-134" manufactured by Koyo Sangyo Company. In addition, after the pressing was performed for 16 hours at room temperature under a pressure of 1.5 MPa, the aging was performed for 7 days to allow for normalization (equilibrium moisture content: about 10%). Each production example 1 was obtained by laminating ten veneers, which had been cut away from the same raw wood material, and is identified by adding characters (A to E) which identify the raw wood material following the number of the production example.

Except for applying the adhesive so that the amount of the solid content of the adhesive per unit area in and around the boundary region of the adjacent veneers became 200 g/m², and setting the pressure when pressing to be 0.5 MPa, a plurality of production examples 2 were produced under the same condition as that of the production example 1. It should be noted that the veneers which had been cut away in order from the same raw wood material were alternately extracted, then one was used for the production example 1, and another was used for the production example 2. The character (A to E) following the number in the production example 2 means that the veneers cut away from the same raw wood material as the production example 1 having the identical character following each number were used.

Specimen

The production examples 1A to 1E were cut away to obtain five square plate-shaped specimens 1A-L to 1E-L and specimens 1A-T to 1E-T, respectively, with a length of 280 mm and a width of 30 mm. The specimens 1A-L to 1E-L were cut away so that the length direction was in parallel with the fiber direction of the production examples 1A to 1E, and the specimens 1A-T to 1E-T were cut away so that the length direction was orthogonal to the fiber direction of the production examples 1A to 1E. In a similar manner, the production examples 2A to 2E were cut away to obtain five square plate-shaped specimens 2A-L to 2E-L and specimens 2A-T to 2E-T, respectively, having a length of 280 mm and a width of 30 mm.

When the layer structures of the production examples 1, 2 were ascertained by observing the cut section of the specimens, in the production example 1, the veneer was impregnated with the adhesive, and the adjacent veneers were substantially in contact with each other. On the other hand, in the production example 2, the adhesive remained between the facing surfaces of the adjacent veneers.

Tapping Test

On each specimen, the vibration characteristics were verified by using a tapping test equipment. The tapping test equipment is designed so that: a specimen is placed on a pair of strings stretched in parallel; one end of the specimen is hit by a hammer; and the vibrational transmission is ascertained by monitoring the vibration. Although the sonic speed in the specimen, the loss tangent (tan δ) of the specimen and the like are derived by performing a modal analysis on the data obtained by means of this tapping test equipment, since the modal analysis of vibration phenomenon is a known methodology, detailed description of the procedure is omitted.

In the following Table 1, the measured values (average value of five specimens) of the sonic speed and the loss tangent at first to fourth resonance frequency, and each of the first to fourth resonance frequency of the specimens 1A-L to 1E-L and the specimens 2A-L to 2E-L measured by the tapping test are shown. In addition, in Table 2, the measured values (average value of five specimens) of the sonic speed and the loss tangent at first to fourth resonance frequency, and each of the first to fourth resonance frequency of the specimens 1A-T to 1E-T and the specimens 2A-T to 2E-T are shown.

TABLE 1

| Production example | Measurement item | 1st Resonance Frequency | 2nd Resonance Frequency | 3rd Resonance Frequency | 4th Resonance Frequency |
|---|---|---|---|---|---|
| 1A-L | tan δ × 10$^{-3}$ | 8.2 | 10.2 | 13.9 | 20.5 |
|  | Frequency (Hz) | 693.8 | 1819.0 | 3331.0 | 5088.0 |
|  | Sonic speed (m/s) | 5035.3 | 4789.7 | 4474.4 | 4113.1 |
| 1B-L | tan δ × 10$^{-3}$ | 7.8 | 12.0 | 13.8 | 22.6 |
|  | Frequency (Hz) | 693.8 | 1825.0 | 3344.0 | 5112.0 |
|  | Sonic speed (m/s) | 5038.7 | 4808.7 | 4494.8 | 4135.3 |
| 1C-L | tan δ × 10$^{-3}$ | 7.9 | 10.5 | 13.1 | 18.2 |
|  | Frequency (Hz) | 693.8 | 1825.0 | 3369.0 | 5163.0 |
|  | Sonic speed (m/s) | 5044.0 | 4813.7 | 4533.2 | 4180.9 |
| 1D-L | tan δ × 10$^{-3}$ | 7.5 | 11.0 | 12.6 | 19.7 |
|  | Frequency (Hz) | 693.8 | 1831.0 | 3375.0 | 5200.0 |
|  | Sonic speed (m/s) | 5053.6 | 4838.8 | 4549.9 | 4218.9 |
| 1E-L | tan δ × 10$^{-3}$ | 7.3 | 9.7 | 12.0 | 18.4 |
|  | Frequency (Hz) | 687.5 | 1838.0 | 3406.0 | 5288.0 |
|  | Sonic speed (m/s) | 5014.2 | 4863.3 | 4597.4 | 4295.6 |
| 2A-L | tan δ × 10$^{-3}$ | 10.4 | 12.8 | 15.4 | 20.2 |
|  | Frequency (Hz) | 668.0 | 1788.0 | 3313.0 | 5150.0 |
|  | Sonic speed (m/s) | 4710.4 | 4574.1 | 4323.5 | 4044.7 |
| 2B-L | tan δ × 10$^{-3}$ | 10.4 | 12.8 | 16.1 | 20.9 |
|  | Frequency (Hz) | 668.8 | 1769.0 | 3300.0 | 5138.0 |
|  | Sonic speed (m/s) | 4708.3 | 4518.4 | 4299.8 | 4029.0 |
| 2C-L | tan δ × 10$^{-3}$ | 10.6 | 12.5 | 16.2 | 21.0 |
|  | Frequency (Hz) | 668.8 | 1769.0 | 3294.0 | 5138.0 |
|  | Sonic speed (m/s) | 4712.2 | 4522.1 | 4295.6 | 4032.3 |
| 2D-L | tan δ × 10$^{-3}$ | 10.3 | 12.5 | 14.5 | 19.9 |
|  | Frequency (Hz) | 656.3 | 1750.0 | 3263.0 | 5100.0 |
|  | Sonic speed (m/s) | 4613.5 | 4463.3 | 4245.4 | 3993.3 |

TABLE 1-continued

| Production example | Measurement item | 1st Resonance Frequency | 2nd Resonance Frequency | 3rd Resonance Frequency | 4th Resonance Frequency |
|---|---|---|---|---|---|
| 2E-L | tan δ × 10$^{-3}$ | 10.3 | 12.3 | 14.5 | 20.8 |
| | Frequency (Hz) | 662.5 | 1769.0 | 3288.0 | 5138.0 |
| | Sonic speed (m/s) | 4663.9 | 4518.0 | 4283.8 | 4028.6 |

TABLE 2

| Production example | Measurement item | 1st Resonance Frequency | 2nd Resonance Frequency | 3rd Resonance Frequency | 4th Resonance Frequency |
|---|---|---|---|---|---|
| 1A-T | tan δ × 10$^{-3}$ | 29.9 | 28.2 | 28.2 | 28.6 |
| | Frequency (Hz) | 152.0 | 420.0 | 816.0 | 1325.0 |
| | Sonic speed (m/s) | 1126.4 | 1129.2 | 1119.1 | 1093.6 |
| 1B-T | tan δ × 10$^{-3}$ | 27.7 | 27.8 | 27.4 | 27.6 |
| | Frequency (Hz) | 152.0 | 420.0 | 816.0 | 1326.0 |
| | Sonic speed (m/s) | 1115.6 | 1118.3 | 1108.4 | 1084.0 |
| 1C-T | tan δ × 10$^{-3}$ | 29.6 | 26.2 | 26.0 | 27.6 |
| | Frequency (Hz) | 152.0 | 420.0 | 818.0 | 1328.0 |
| | Sonic speed (m/s) | 1111.9 | 1114.6 | 1107.4 | 1082.0 |
| 1D-T | tan δ × 10$^{-3}$ | 26.3 | 26.7 | 25.9 | 27.7 |
| | Frequency (Hz) | 154.0 | 422.0 | 824.0 | 1328.0 |
| | Sonic speed (m/s) | 1123.6 | 1117.0 | 1112.6 | 1079.2 |
| 1E-T | tan δ × 10$^{-3}$ | 26.7 | 26.4 | 26.1 | 27.2 |
| | Frequency (Hz) | 154.0 | 422.0 | 822.0 | 1331.0 |
| | Sonic speed (m/s) | 1122.1 | 1115.5 | 1108.5 | 1080.2 |
| 2A-T | tan δ × 10$^{-3}$ | 44.7 | 45.4 | 47.9 | 43.2 |
| | Frequency (Hz) | 164.0 | 462.0 | 896.0 | 1460.0 |
| | Sonic speed (m/s) | 1122.9 | 1147.6 | 1135.3 | 1113.3 |
| 2B-T | tan δ × 10$^{-3}$ | 38.9 | 48.4 | 47.3 | 42.8 |
| | Frequency (Hz) | 166.0 | 462.0 | 904.0 | 1456.0 |
| | Sonic speed (m/s) | 1132.6 | 1143.5 | 1141.4 | 1106.4 |
| 2C-T | tan δ × 10$^{-3}$ | 49.6 | 46.8 | 44.1 | 44.7 |
| | Frequency (Hz) | 166.0 | 462.0 | 902.0 | 1469.0 |
| | Sonic speed (m/s) | 1133.9 | 1144.9 | 1140.3 | 1117.6 |
| 2D-T | tan δ × 10$^{-3}$ | 51.0 | 44.1 | 48.0 | 42.9 |
| | Frequency (Hz) | 166.0 | 462.0 | 896.0 | 1466.0 |
| | Sonic speed (m/s) | 1131.7 | 1142.7 | 1130.5 | 1113.2 |
| 2E-T | tan δ × 10$^{-3}$ | 45.3 | 48.1 | 49.8 | 50.8 |
| | Frequency (Hz) | 166.0 | 460.0 | 902.0 | 1469.0 |
| | Sonic speed (m/s) | 1132.0 | 1138.1 | 1138.4 | 1115.8 |

Thus, while the sonic speed at the first resonance frequency in the specimens 1A-L to 1E-L was about 5000 m/s, the sonic speed at the first resonance frequency in the specimens 2A-L to 2E-L was about 4700 m/s. In addition, while the loss tangent at the first resonance frequency in the specimens 1A-L to 1E-L ranged from 7.3×10$^{-3}$ to 8.2×10$^{-3}$, the loss tangent at the first resonance frequency in the specimens 2A-L to 2E-L ranged from 10.3×10$^{-3}$ to 10.6×10$^{-3}$.

In general, as an acoustic material, it is considered to be preferred that the sonic speed is high and the loss tangent is small for producing a greater sound lasting for a long period of time. Therefore, it can be concluded that the production examples 1A to 1E in which veneers were substantially in contact with each other due to a small amount of the adhesive between the veneers were superior in vibration characteristics as a sound board for a musical instrument in the fiber direction as compared with the production examples 2A to 2E in which the adhesive remained between the facing surfaces of the veneers due to a large amount of the adhesive between the veneers.

In addition, the sonic speed at the first resonance frequency in the fiber direction of a straight-grained solid wood material made of natural birch having the same dimensions with the specimens 1A-L to 1E-L and specimens 2A-L to 2E-L is about 5100 m/s, and the loss tangent at the first resonance frequency is about 6×10$^{-3}$. Therefore, it is concluded that the production examples 1A to 1E had the vibration characteristics relatively similar to those of the solid wood material made of natural birch.

On the other hand, both the sonic speed at the first resonance frequency in the specimens 1A-T to 1E-T and the sonic speed at the first resonance frequency in the specimens 2A-T to 2E-T were about 1100 m/s, indicating no significant difference. However, while the loss tangent at the first resonance frequency in the specimens 1A-T to 1E-T ranged from 26.3×10$^{-3}$ to 29.9×10$^{-3}$, the loss tangent at the first resonance frequency in the specimen 2A-T to 2E-T ranged from 38.9×10$^{-3}$ to 51.0×10$^{-3}$.

Therefore, it can be concluded that the production examples 1A to 1E in which the veneers were substantially in contact with one another due to the small amount of the adhesive between the veneers were superior in vibration characteristics as a sound board for a musical instrument in the vertical direction to the fiber direction as compared with the production examples 2A to 2E in which the adhesive remained between the facing surfaces of the veneers due to the large amount of the adhesive between the veneers.

Figure 3:
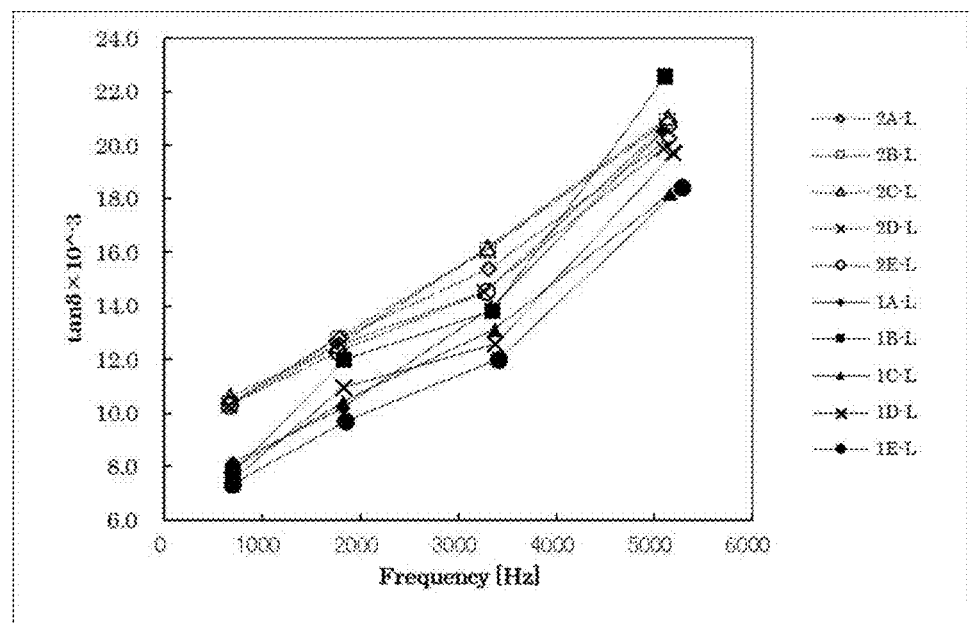
FIG. 3 is a graph illustrating the frequency response of the loss tangent along the fiber direction (i.e., direction of fibers) of production examples of acoustic materials.
Figure 4:
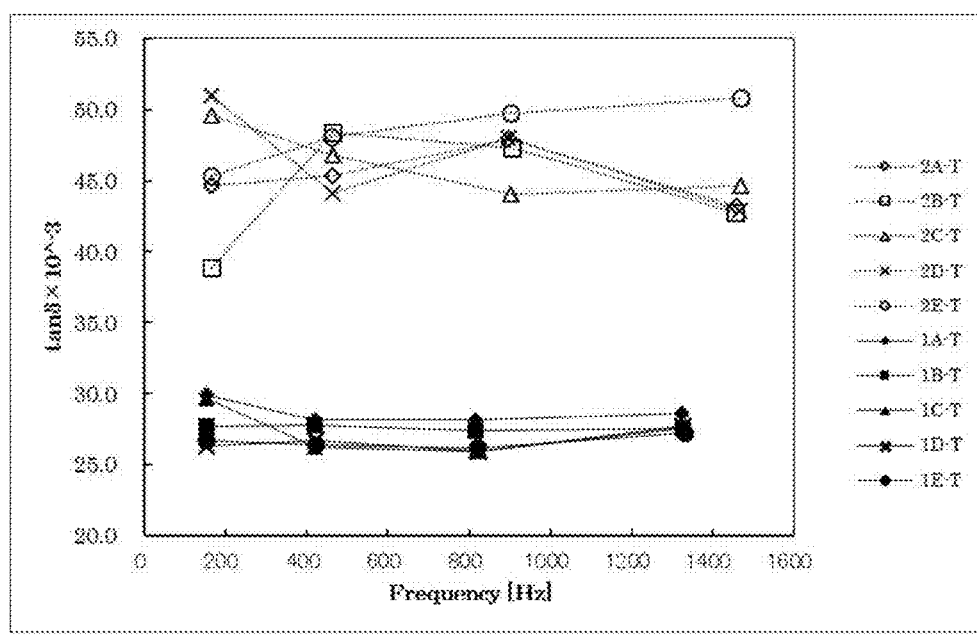
FIG. 4 is a graph illustrating the frequency response of the loss tangent in the vertical direction to the fibers of the production examples of the acoustic materials in FIG. 3.

Further, in FIG. 3, the frequency response of the loss tangent of the specimens 1A-L to 1E-L and the specimens 2A-L to 2E-L are shown, and in FIG. 4, the frequency response of the loss tangent of the specimens 1A-T to 1E-T and the specimens 2A-T to 2E-T are shown.

As illustrated in figures, although the production example 1 exhibited variation which is considered to result from the difference of the raw material timber, the production example 1 had the tendency that the loss tangent in the fiber direction throughout the entire frequency range was smaller than that of the production example 2 on the whole, and the loss tangent in the vertical direction to the fiber direction was clearly smaller than that of the production example 2. Thus, the production example 1 had superior vibration characteristics as a sound board for a musical instrument in the throughout entire frequency range to that of the production example 2.

Production Examples 3 and 4

Ten square plate-shaped slice veneers made of spruce (veneer of straight-grained part cut away in radial direction) with a width of 330 mm, a length of 500 mm and a thickness of 1 mm were laminated by means of the adhesive to make a plurality of production examples 3 of the acoustic material (laminated veneer lumber). In the production example 3, the adhesive was applied by means of ink-jet so that the amount of the adhesive per unit area in and around the boundary region of the adjacent veneers became 25 g/m². The adhesive used was prepared by adding 10 parts by mass of flour for industrial use manufactured by Nisshin Seifun Group Inc. as a filler to 100 parts by mass of a water-soluble phenolic resin-based adhesive "D-17S" manufactured by Oshika Company and diluting the mixture with 240 parts by mass of water. In addition, after being pressed for ten minutes at a temperature of 140° C. under a pressure of 0.5 MPa, the adhesive was aged for 7 days to allow for normalization (equilibrium moisture content: about 10%). Each production example 3 was obtained by laminating ten veneers, which had been cut away from the same raw wood material, and was identified by adding characters (A to E) which identify the raw wood material following the number of the production example.

Production example 4 was produced under the same condition as that of the production example 3 except that the adhesive was applied so that the amount of the solid content of the adhesive per unit area in and around the boundary region of the adjacent veneers became 250 g/m², and that water was not added to the adhesive. It should be noted that the veneers which had been cut away in order from the same raw wood material were alternately extracted, then one was used for the production example 3, and another was used for the production example 4. The character (A to E) following the number in the production example 4 means that the veneers cut away from the same raw wood material as the production example 3 having the identical character following each number were used.

Specimen

The production examples 3A to 3E were cut away to obtain five square plate-shaped specimens 3A-L to 3E-L and specimens 3A-R to 3E-R, respectively, with a length of 280 mm an a width of 30 mm. The specimens 3A-L to 3E-L were cut away so that the length direction was in parallel with the fiber direction of the production examples 3A to 3E, and the specimens 3A-R to 3E-R were cut away so that the length direction was substantially orthogonal to the fiber direction of the production examples 3A to 3E. In a similar manner, the production examples 4A to 4E were cut away to obtain five square plate-shaped specimens 4A-L to 4E-L and specimens 4A-R to 4E-R respectively, having a length of 280 mm and a width of 30 mm.

When the layer structures of the production examples 3 an 4 were ascertained by observing the cross sections of the specimens, in the production example 3, the veneer was impregnated with the adhesive, and the adjacent veneers were substantially in contact with each other. On the other hand, in the production example 4, the adhesive remained between the facing surfaces of the adjacent veneers.

In addition, in order to compare the production examples 3A to 3E and the production examples 4A to 4E, specimens 5A-L to 5E-L of a solid wood material (straight-grained board) made of spruce which had the same dimensions with the production examples 3A to 3E and the production examples 4A to 4E, and the fiber direction was in parallel with the length direction were prepared.

Tapping Test

On each specimen, the vibration characteristics were verified by using the same tapping test equipment with the one used for the test of the specimens of the above-described production examples 1A to 1E and production examples 2A to 2E.

In the following Table 3, the measured values (average value of five specimens) of the sonic speed and the loss tangent at first to fourth resonance frequency, and each of the first to fourth resonance frequency of the specimens 3A-L to 3E-L, the specimens 4A-L to 4E-L and the specimens 5A-L to 5E-L measured by the tapping test are shown. In addition, in Table 4, the measured values (the average value of five specimens) of the sonic speed and the loss tangent at first to fourth resonance frequency, and each of the first to fourth resonance frequency of the specimens 3A-R to 3E-R and the specimens 4A-R to 4E-R are shown.

TABLE 3

| Production example | Measurement item | 1st Resonance Frequency | 2nd Resonance Frequency | 3rd Resonance Frequency | 4th Resonance Frequency |
|---|---|---|---|---|---|
| 3A-L | $\tan \delta \times 10^{-3}$ | 6.6 | 8.1 | 11.6 | 20.1 |
|  | Frequency (Hz) | 700.0 | 1855.0 | 3430.0 | 5300.0 |
|  | Sonic speed (m/s) | 5478.8 | 5267.2 | 4968.3 | 4620.2 |
| 3B-L | $\tan \delta \times 10^{-3}$ | 6.7 | 8.2 | 11.4 | 19.1 |
|  | Frequency (Hz) | 700.0 | 1840.0 | 3395.0 | 5230.0 |
|  | Sonic speed (m/s) | 5537.7 | 5280.8 | 4970.5 | 4608.2 |
| 3C-L | $\tan \delta \times 10^{-3}$ | 6.7 | 8.4 | 11.6 | 20.7 |
|  | Frequency (Hz) | 705.0 | 1855.0 | 3415.0 | 5260.0 |
|  | Sonic speed (m/s) | 5577.2 | 5323.8 | 4999.8 | 4634.6 |
| 3D-L | $\tan \delta \times 10^{-3}$ | 6.6 | 8.3 | 11.4 | 18.9 |
|  | Frequency (Hz) | 718.8 | 1890.0 | 3480.0 | 5330.0 |
|  | Sonic speed (m/s) | 5686.0 | 5424.3 | 5095.0 | 4696.3 |
| 3E-L | $\tan \delta \times 10^{-3}$ | 6.9 | 8.7 | 11.7 | 20.0 |
|  | Frequency (Hz) | 707.5 | 1865.0 | 3440.0 | 5300.0 |
|  | Sonic speed (m/s) | 5597.0 | 5352.5 | 5036.4 | 4669.9 |

TABLE 3-continued

| Production example | Measurement item | 1st Resonance Frequency | 2nd Resonance Frequency | 3rd Resonance Frequency | 4th Resonance Frequency |
|---|---|---|---|---|---|
| 4A-L | tan δ × 10$^{-3}$ | 9.4 | 11.3 | 13.8 | 16.9 |
| | Frequency (Hz) | 593.8 | 1568.0 | 2925.0 | 4540.0 |
| | Sonic speed (m/s) | 4748.2 | 4549.1 | 4329.0 | 4043.7 |
| 4B-L | tan δ × 10$^{-3}$ | 9.4 | 11.3 | 14.1 | 17.1 |
| | Frequency (Hz) | 598.8 | 1580.0 | 2935.0 | 4531.0 |
| | Sonic speed (m/s) | 4788.2 | 4583.9 | 4343.8 | 4035.7 |
| 4C-L | tan δ × 10$^{-3}$ | 9.5 | 11.4 | 14.5 | 18.8 |
| | Frequency (Hz) | 591.3 | 1560.0 | 2900.0 | 4481.0 |
| | Sonic speed (m/s) | 4780.2 | 4575.6 | 4339.1 | 4035.0 |
| 4D-L | tan δ × 10$^{-3}$ | 9.6 | 11.4 | 14.1 | 17.5 |
| | Frequency (Hz) | 596.3 | 1575.0 | 2935.0 | 4513.0 |
| | Sonic speed (m/s) | 4874.2 | 4670.9 | 4440.3 | 4109.0 |
| 4E-L | tan δ × 10$^{-3}$ | 9.6 | 11.3 | 14.8 | 17.8 |
| | Frequency (Hz) | 587.5 | 1550.0 | 2880.0 | 4463.0 |
| | Sonic speed (m/s) | 4802.6 | 4596.8 | 4357.1 | 4063.5 |
| 5A-L | tan δ × 10$^{-3}$ | 6.5 | 8.3 | 10.4 | 18.0 |
| | Frequency (Hz) | 715.0 | 1910.0 | 3540.0 | 5450.0 |
| | Sonic speed (m/s) | 5208.3 | 5047.5 | 4772.3 | 4421.7 |
| 5B-L | tan δ × 10$^{-3}$ | 5.3 | 7.1 | 9.3 | 14.6 |
| | Frequency (Hz) | 716.3 | 1900.0 | 3556.0 | 5500.0 |
| | Sonic speed (m/s) | 5217.4 | 5021.1 | 4793.9 | 4462.2 |
| 5C-L | tan δ × 10$^{-3}$ | 5.7 | 7.5 | 9.4 | 14.4 |
| | Frequency (Hz) | 736.3 | 1960.0 | 3631.0 | 5600.0 |
| | Sonic speed (m/s) | 5363.1 | 5179.6 | 4895.0 | 4543.4 |
| 5D-L | tan δ × 10$^{-3}$ | 5.5 | 7.4 | 9.7 | 14.0 |
| | Frequency (Hz) | 772.5 | 2025.0 | 3731.0 | 5770.0 |
| | Sonic speed (m/s) | 5572.0 | 5298.9 | 4980.5 | 4635.4 |
| 5E-L | tan δ × 10$^{-3}$ | 5.1 | 7.2 | 8.4 | 13.0 |
| | Frequency (Hz) | 767.5 | 2035.0 | 3756.0 | 5800.0 |
| | Sonic speed (m/s) | 5590.8 | 5377.8 | 5063.5 | 4705.6 |

TABLE 4

| Production example | Measurement item | 1st Resonance Frequency | 2nd Resonance Frequency | 3rd Resonance Frequency | 4th Resonance Frequency |
|---|---|---|---|---|---|
| 3A-R | tan δ × 10$^{-3}$ | 23.2 | 21.3 | 23.1 | 21.2 |
| | Frequency (Hz) | 140.0 | 381.3 | 730.0 | 1185.0 |
| | Sonic speed (m/s) | 1095.8 | 1082.5 | 1057.4 | 1033.0 |
| 3B-R | tan δ × 10$^{-3}$ | 22.4 | 20.9 | 21.5 | 21.2 |
| | Frequency (Hz) | 140.0 | 383.8 | 737.5 | 1184.0 |
| | Sonic speed (m/s) | 1095.8 | 1089.6 | 1068.3 | 1032.1 |
| 3C-R | tan δ × 10$^{-3}$ | 20.2 | 20.6 | 20.0 | 21.1 |
| | Frequency (Hz) | 138.8 | 381.3 | 732.5 | 1184.0 |
| | Sonic speed (m/s) | 1097.6 | 1094.2 | 1072.4 | 1043.2 |
| 3D-R | tan δ × 10$^{-3}$ | 22.2 | 21.4 | 21.1 | 21.7 |
| | Frequency (Hz) | 138.8 | 377.5 | 726.3 | 1169.0 |
| | Sonic speed (m/s) | 1097.6 | 1083.4 | 1063.3 | 1030.0 |
| 3E-R | tan δ × 10$^{-3}$ | 22.3 | 21.2 | 22.4 | 22.1 |
| | Frequency (Hz) | 138.8 | 377.5 | 723.8 | 1172.0 |
| | Sonic speed (m/s) | 1097.6 | 1083.4 | 1059.6 | 1032.7 |
| 4A-R | tan δ × 10$^{-3}$ | 31.7 | 31.6 | 30.9 | 31.4 |
| | Frequency (Hz) | 153.8 | 420.0 | 807.5 | 1290.0 |
| | Sonic speed (m/s) | 1271.0 | 1259.6 | 1235.4 | 1187.7 |
| 4B-R | tan δ × 10$^{-3}$ | 33.0 | 33.6 | 34.8 | 32.2 |
| | Frequency (Hz) | 148.8 | 406.3 | 782.5 | 1255.0 |
| | Sonic speed (m/s) | 1229.6 | 1218.3 | 1197.1 | 1155.5 |
| 4C-R | tan δ × 10$^{-3}$ | 34.6 | 34.2 | 35.1 | 35.3 |
| | Frequency (Hz) | 140.0 | 386.3 | 740.0 | 1190.0 |
| | Sonic speed (m/s) | 1170.5 | 1171.5 | 1145.0 | 1108.1 |
| 4D-R | tan δ × 10$^{-3}$ | 34.9 | 33.4 | 35.9 | 35.2 |
| | Frequency (Hz) | 136.3 | 375.0 | 720.0 | 1160.0 |
| | Sonic speed (m/s) | 1139.1 | 1137.4 | 1114.0 | 1080.2 |
| 4E-R | tan δ × 10$^{-3}$ | 36.2 | 35.9 | 34.7 | 34.5 |
| | Frequency (Hz) | 135.0 | 365.0 | 702.5 | 1135.0 |
| | Sonic speed (m/s) | 1116.0 | 1094.6 | 1074.7 | 1045.0 |

As shown in Table 3, while the sonic speed at the first resonance frequency in the specimens 3A-L to 3E-L ranged from about 5500 m/s to about 5700 m/s, the sonic speed at the first resonance frequency in the specimens 4A-L to 4E-L ranged from about 4700 m/s to about 4900 m/s. In addition, the sonic speed at the first resonance frequency in the specimens 5A-L to 5E-L ranged from about 5200 m/s to about 5600 m/s.

Thus, the specimens 3A-L to 3E-L in which the veneers were substantially in contact with one another due to the small amount of the adhesive exhibited approximately the same sonic speed as that for the solid wood material of natural wood, accompanied by less variation; however, in the specimens 4A-L to 4E-L in which the adhesive remained between the facing surfaces of the veneers due to the large amount of the adhesive exhibited a low sonic speed, and were inferior in vibration characteristics as a sound board for a musical instrument.

In addition, while the loss tangent at the first resonance frequency in the specimens 3A-L to 3E-L ranged from $6.6 \times 10^{-3}$ to $6.9 \times 10^{-3}$, the loss tangent at the first resonance frequency in the specimens 4A-L to 4E-L ranged from $9.4 \times 10^{-3}$ to $9.6 \times 10^{-3}$. In addition, the loss tangent at the first resonance frequency in the specimens 5A-L to 5E-L ranged from $5.1 \times 10^{-3}$ to $6.5 \times 10^{-3}$.

Thus, the specimens 3A-L to 3E-L with the small amount of the adhesive, had the loss tangent being not greatly different from that of the solid wood material of natural wood, accompanied by less variation; however, the specimens 4A-L to 4E-L with the large amount of the adhesive, had a large loss tangent, and were inferior in the vibration characteristics.

On the other hand, the sonic speed at the first resonance frequency in the specimens 3A-R to 3E-R was about 1100 m/s and almost constant, and the sonic speed at the first resonance frequency in the specimens 4A-R to 4E-R ranged from about 1100 m/s to 1300 m/s. In terms of the average values, the specimens 4A-L to 4E-L exhibited slightly higher sonic speed, which may be regarded as falling within an error range, whereas the specimens 3A-R to 3E-R indicated less variation in terms of the sonic speed.

In addition, while the loss tangent at the first resonance frequency in the specimens 3A-R to 3E-R ranged from $20.2 \times 10^{-3}$ to $23.2 \times 10^{-3}$, the loss tangent at the first resonance frequency in the specimens 4A-R to 4E-R ranged from $31.7 \times 10^{-3}$ to $36.2 \times 10^{-3}$. Thus, the specimens 3A-R to 3E-R had the smaller loss tangent, and had more preferred vibration characteristics owing to the less variation in the loss tangent.

Therefore, it is concluded that the production examples 3A to 3E with the small amount of the adhesive between the veneers were superior also in vibration characteristics in the vertical direction to the fiber direction as compared with the production examples 4A to 4E with the large amount of the adhesive between the veneers.

Figure 5:
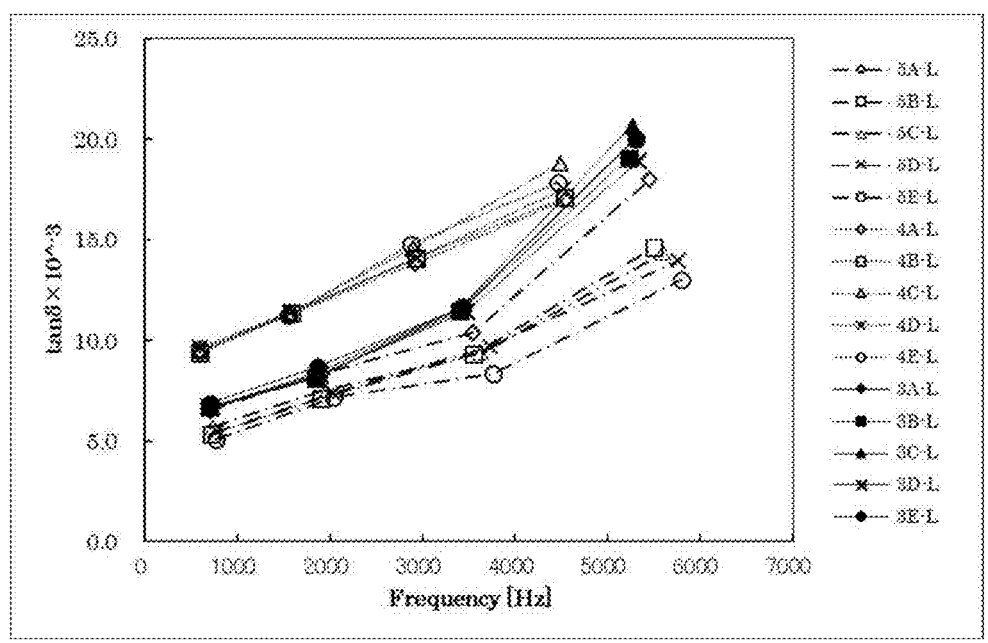
FIG. 5 is a graph illustrating the frequency response of the loss tangent along the fiber direction of production examples of acoustic materials being different from those in FIG. 3.
Figure 6:
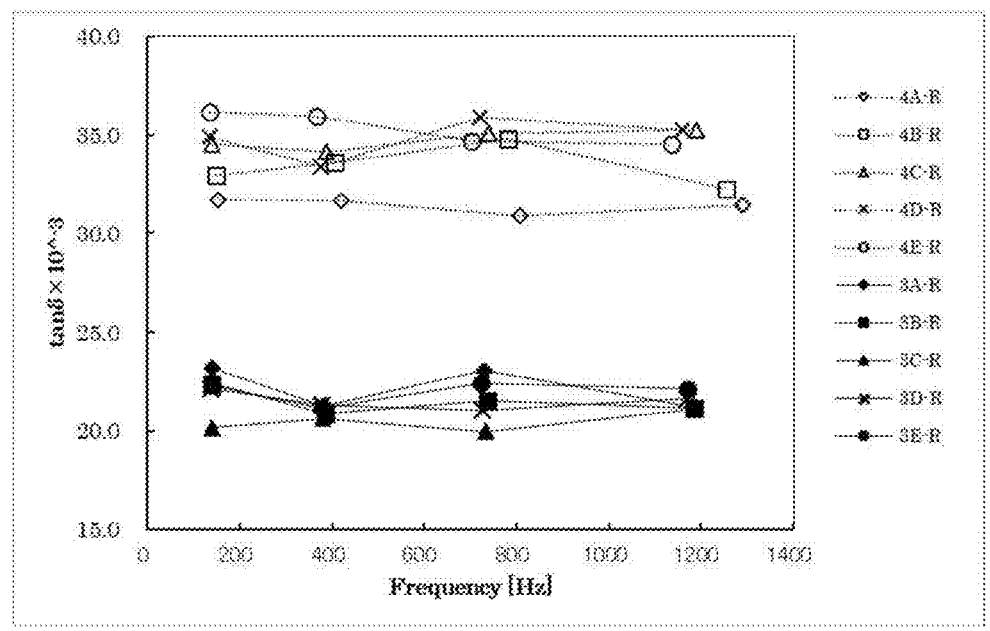
FIG. 6 is a graph illustrating the frequency response of the loss tangent in the vertical direction to the fiber of the production examples of the acoustic materials in FIG. 5.

Further, in FIG. 5, the frequency response of the loss tangent of the specimens 3A-L to 3E-L, the specimens 4A-L to 4E-L and the specimens 5A-L to 5E-L is shown, and in FIG. 6, the frequency response of the loss tangent of the specimens 3A-R to 3E-R and the specimens 4A-R to 4E-R is shown.

As illustrated in figures, the production examples 3A to 3E in which the veneers were substantially in contact with one another due to the small amount of the adhesive had the tendency that the loss tangent was larger than that of the solid wood material in high frequency band, and had the vibration characteristics relatively similar to those of the solid wood material as a whole. In contrast, the production examples 4A to 4E in which the adhesive remained between the facing surfaces of the veneers due to the large amount of the adhesive had different vibration characteristics from those of the solid wood material, and were inferior in the vibration characteristics to the production examples 3A to 3E as a sound board for a musical instrument.

Production Examples 6 to 10

Production examples 6 to 10 in which only the amount of the adhesive per unit area in and around the boundary region of the adjacent veneers were changed from that of the production examples 4A to 4E were produced. The results of the measurement revealed that the amount of the adhesive was: 4.0 g/m$^2$ in production example 6; 6.8 g/m$^2$ in the production example 7; 17.6 g/m$^2$ in the production example 8; 27.5 g/m$^2$ in the production example 9; and 80.0 g/m$^2$ in the production example 10. For these production examples 6 to 10, four pieces were respectively made by using the veneers cut away from four each different raw wood materials. It should be noted that following the number of the production example obtained by using the veneer cut away from the identical raw wood material, the identical characters (A to D) are added for identification.

Specimen

The production examples 6 to 10 were cut away to obtain square plate-shaped specimens with a length of 280 mm and a width of 30 mm, in which the fiber direction was in parallel with the length direction. Then the vibration characteristics of these specimens were verified by means of the same tapping test equipment as that used in the test of the specimens of the above-described production examples 1A to 1E and the production examples 2A to 2E.

In the following Table 5, the measured values (average value of 4 specimens) of the sonic speed and the loss tangent at first to fourth resonance frequency, and each of the first to fourth resonance frequency of each specimen of the production examples 6 to 10 measured by the tapping test are shown.

TABLE 5

| Production example | Measurement item | 1st Resonance Frequency | 2nd Resonance Frequency | 3rd Resonance Frequency | 4th Resonance Frequency |
|---|---|---|---|---|---|
| 6A | tan δ × 10$^{-3}$ | 7.6 | 8.5 | 10.8 | 13.8 |
|  | Sonic speed (m/s) | 4746.0 | 4614.2 | 4470.7 | 4240.2 |
| 6B | tan δ × 10$^{-3}$ | 8.2 | 8.7 | 10.6 | 12.1 |
|  | Sonic speed (m/s) | 4326.3 | 4226.4 | 4089.5 | 3903.9 |
| 6C | tan δ × 10$^{-3}$ | 7.8 | 9.2 | 10.5 | 12.4 |
|  | Sonic speed (m/s) | 4415.4 | 4300.3 | 4164.3 | 3962.5 |
| 7A | tan δ × 10$^{-3}$ | 7.7 | 8.7 | 10.7 | 13.4 |
|  | Sonic speed (m/s) | 4733.1 | 4585.1 | 4466.1 | 4241.9 |

TABLE 5-continued

| Production example | Measurement item | 1st Resonance Frequency | 2nd Resonance Frequency | 3rd Resonance Frequency | 4th Resonance Frequency |
|---|---|---|---|---|---|
| 7B | tan δ × 10$^{-3}$ | 8.4 | 8.7 | 11.0 | 12.4 |
|  | Sonic speed (m/s) | 4327.7 | 4225.4 | 4074.6 | 3874.8 |
| 7C | tan δ × 10$^{-3}$ | 7.9 | 8.6 | 10.8 | 16.5 |
|  | Sonic speed (m/s) | 4421.8 | 4293.0 | 4146.2 | 3930.5 |
| 8A | tan δ × 10$^{-3}$ | 7.8 | 8.7 | 11.2 | 16.2 |
|  | Sonic speed (m/s) | 4984.3 | 4893.5 | 4691.5 | 4435.4 |
| 8B | tan δ × 10$^{-3}$ | 8.5 | 9.2 | 11.3 | 12.1 |
|  | Sonic speed (m/s) | 4328.4 | 4210.9 | 4067.8 | 3841.6 |
| 8C | tan δ × 10$^{-3}$ | 8.2 | 9.0 | 10.9 | 13.6 |
|  | Sonic speed (m/s) | 4496.9 | 4396.8 | 4240.0 | 4012.6 |
| 9A | tan δ × 10$^{-3}$ | 8.1 | 9.2 | 11.5 | 15.1 |
|  | Sonic speed (m/s) | 4802.2 | 4633.4 | 4514.5 | 4286.4 |
| 9B | tan δ × 10$^{-3}$ | 9.0 | 11.1 | 11.6 | 13.3 |
|  | Sonic speed (m/s) | 4148.1 | 4052.8 | 3916.4 | 3737.4 |
| 9C | tan δ × 10$^{-3}$ | 8.6 | 9.9 | 11.7 | 13.0 |
|  | Sonic speed (m/s) | 4301.1 | 4214.0 | 4089.0 | 3871.8 |
| 10A | tan δ × 10$^{-3}$ | 8.8 | 9.4 | 12.1 | 15.9 |
|  | Sonic speed (m/s) | 4590.8 | 4447.4 | 4334.1 | 4124.4 |
| 10B | tan δ × 10$^{-3}$ | 9.8 | 10.9 | 12.8 | 13.3 |
|  | Sonic speed (m/s) | 4026.1 | 3949.8 | 3842.0 | 3690.1 |
| 10C | tan δ × 10$^{-3}$ | 9.3 | 10.3 | 12.3 | 13.7 |
|  | Sonic speed (m/s) | 4173.0 | 4075.7 | 3985.7 | 3796.8 |

Figure 7:
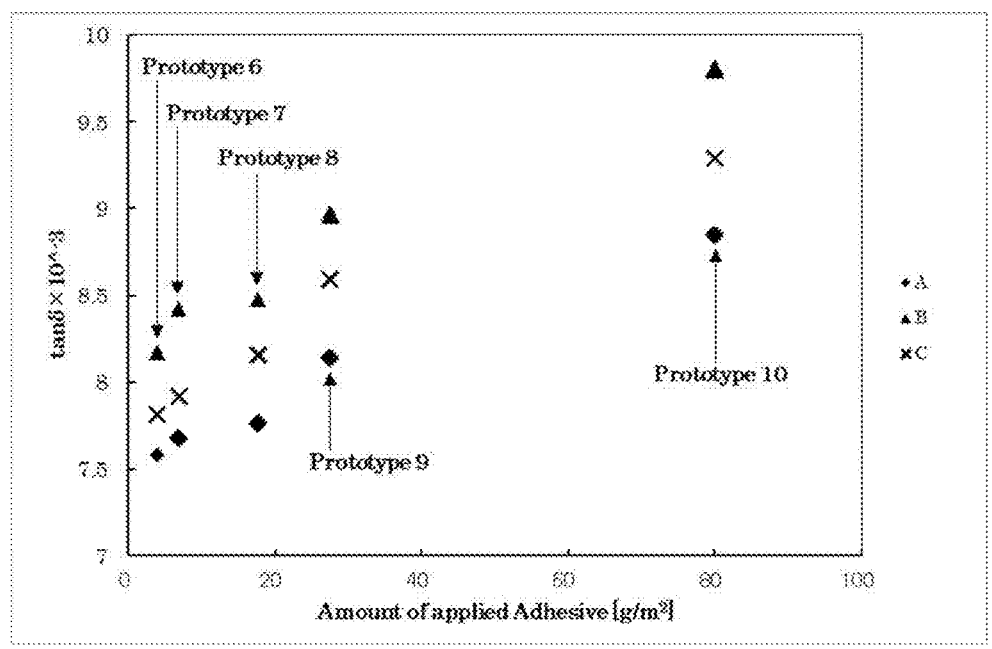
FIG. 7 is a graph illustrating the relation between the amount of an adhesive and the loss tangent along the fiber direction of production examples of acoustic materials being different from those in FIGS. 3 and 5.

In addition, FIG. 7 shows the relationship between the loss tangent and the amount of the adhesive at the first resonance frequency of each specimen of the production examples 6 to 10. As illustrated in the figure, the loss tangent of each production example exhibited the variation of about 1×10$^{-3}$, and identification of the kind of the raw wood material for each amount of the adhesive revealed the loss tangent being in the order of A<C<B. When the loss tangent of the production examples 6 to 10 whose raw wood materials were the same was ascertained in the graph, it is believed that the values of the loss tangent have the correlation of first order with respect to the amount of the adhesive.

Accordingly, it was verified that by reducing the amount of the adhesive between the veneers in the laminated veneer lumber configured from a plurality of wood veneers laminated via the adhesive, and thereby allowing the adjacent veneers impregnate with the adhesive to be substantially in contact with one another, the acoustic material that enables a high sonic speed and has a relatively small loss tangent, and that is relatively similar to a solid wood material of natural wood can be obtained.

INDUSTRIAL APPLICABILITY

The acoustic material of the present invention can be suitably utilized at a relatively low price for providing substitutes for musical instruments and the like produced by using a solid wood material of relatively expensive natural wood.

The invention claimed is:

1. An acoustic material comprising a plurality of wood veneers laminated via an adhesive,
    wherein
        the veneer is impregnated with the adhesive,
        adjacent veneers are substantially in contact with one another, and
        the adjacent veneers are impregnated with the adhesive in an amount of no less than 1 g/m$^2$ and no greater than 50 g/m$^2$ per unit area in and around a boundary region of the adjacent veneers.

2. The acoustic material according to claim 1, wherein the adhesive is a water-soluble adhesive or a water-based emulsion adhesive.

3. The acoustic material according to claim 1, wherein the veneer is a rotary veneer, a sawn veneer or a sliced veneer.

4. A musical instrument comprising a sound board,
    wherein the acoustic material according to claim 1 is used as the sound board.

* * * * *